Figure 1:
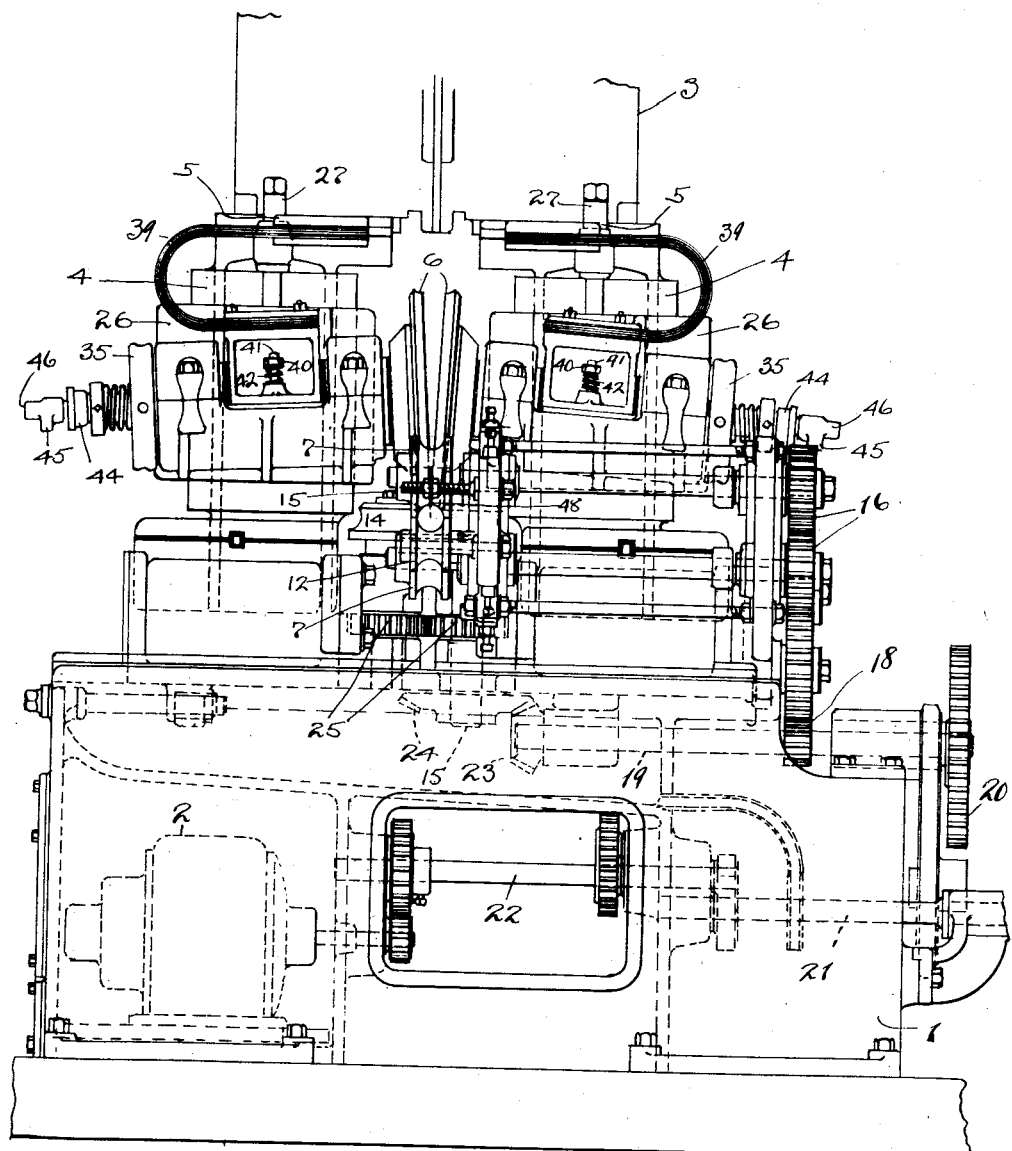

F. L. SESSIONS.
ELECTRIC WELDING MACHINE.
APPLICATION FILED MAY 7, 1913.

1,196,304.

Patented Aug. 29, 1916.
4 SHEETS—SHEET 1.

Witnesses
Oliver M. Kappler
H B Fay

Inventor
Frank L. Sessions
by Fay & Oberlin
Attorneys

F. L. SESSIONS.
ELECTRIC WELDING MACHINE.
APPLICATION FILED MAY 7, 1913.
1,196,304.
Patented Aug. 29, 1916.
4 SHEETS—SHEET 4.
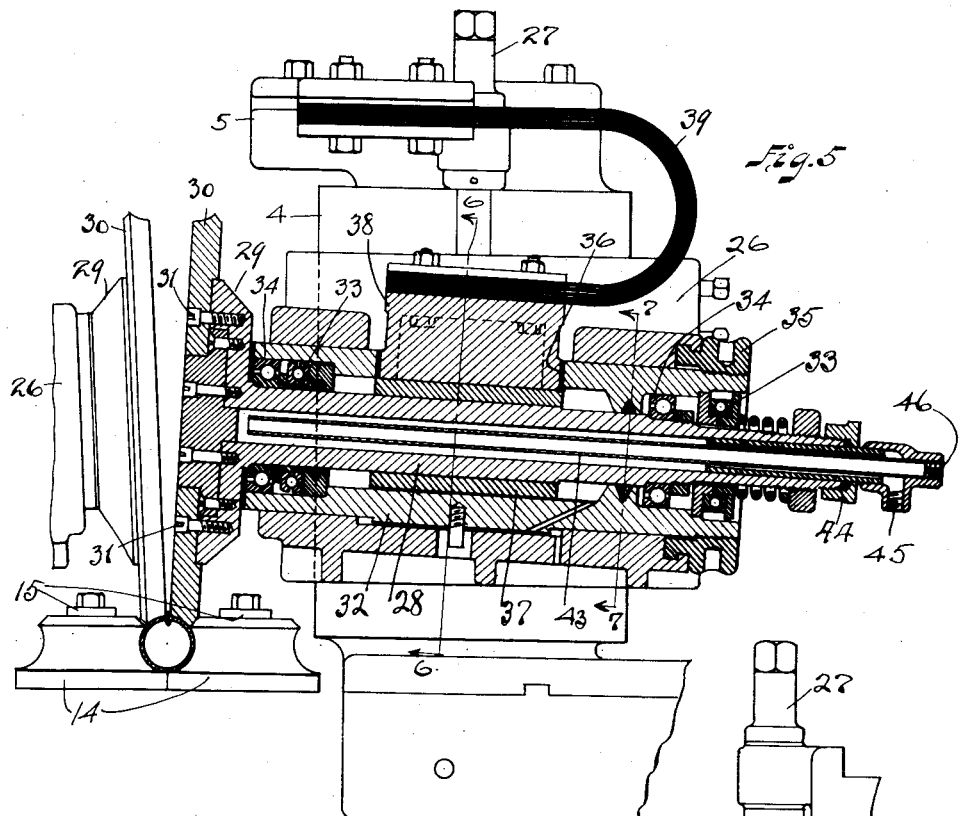
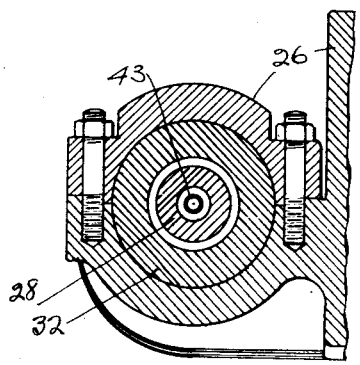
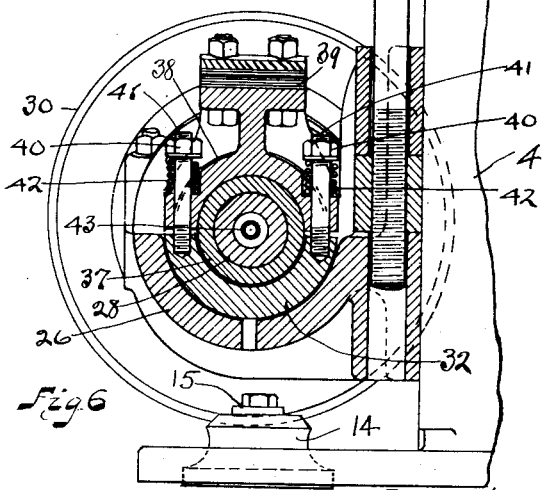
Witnesses:
Oliver M. Kappler
H. B. Fay
Inventor
Frank L. Sessions
by Fay & Oberlin
Attorneys

UNITED STATES PATENT OFFICE.

FRANK L. SESSIONS, OF LAKEWOOD, OHIO, ASSIGNOR TO THE STANDARD WELDING COMPANY, OF CLEVELAND, OHIO, A CORPORATION OF OHIO.

ELECTRIC WELDING-MACHINE.

1,196,304.   Specification of Letters Patent.   Patented Aug. 29, 1916.

Application filed May 7, 1913. Serial No. 766,003.

*To all whom it may concern:*

Be it known that I, FRANK L. SESSIONS, a citizen of the United States, and a resident of Lakewood, county of Cuyahoga, and State of Ohio, have invented a new and useful Improvement in Electric Welding-Machines, of which the following is a specification, the principle of the invention being herein explained and the best mode in which I have contemplated applying that principle, so as to distinguish it from other inventions.

The present improvements, relating as indicated to electric welding machines, have regard more particularly to tube welding machines of the kind described and claimed in U. S. Letters Patent No. 658,741 to Otto Parpart, dated December 25, 1900, wherein rolls are provided for forcing the abutting edges of the tube together by compression, while a heating electric current is simultaneously passed across the joint between such edges, by directly pressing suitable electrodes, or electric-current-conducting devices, along the opposite edges. The electrodes just referred to preferably take the form of rolls having contact edges adapted to conform with the tube being welded and suitably connected with the source of current.

The object of the present invention is to provide a machine of the foregoing type wherein the several operative parts, and particularly the driving mechanism, may be more conveniently disposed than in the prevailing construction, while still providing for all necessary adjustments and changes of speed.

A further object is to improve the mounting for the roll electrodes whereby antifriction bearings may be utilized to take up the strains imposed on said electrodes, while still providing for an uninterrupted and adequate electrical connection between the rolls and the terminals of the secondary transformer, from which the current supply is immediately derived. To the accomplishment of the foregoing and related ends, the invention, then, consists of the means hereinafter fully described and particularly pointed out in the claims.

The annexed drawings and the following description set forth in detail certain mechanism embodying the invention, such disclosed means constituting, however, but one of the various mechanical forms in which the principle of the invention may be used.

Figure 2:
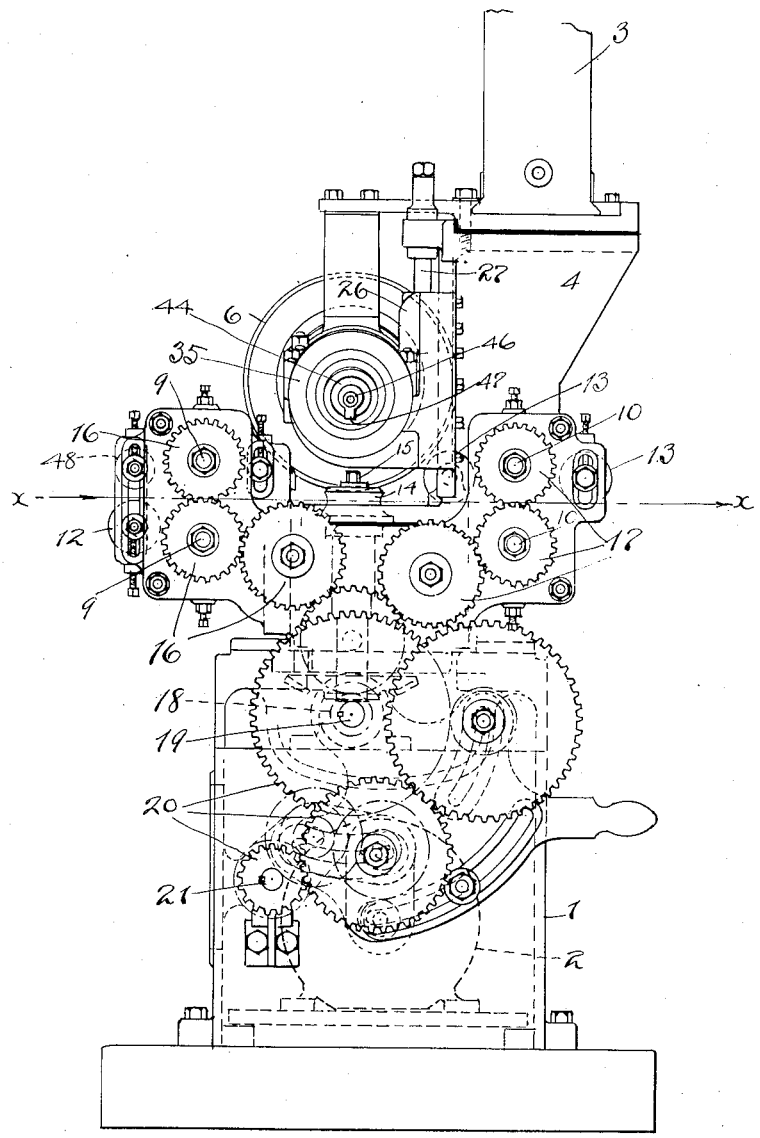
Figure 3:
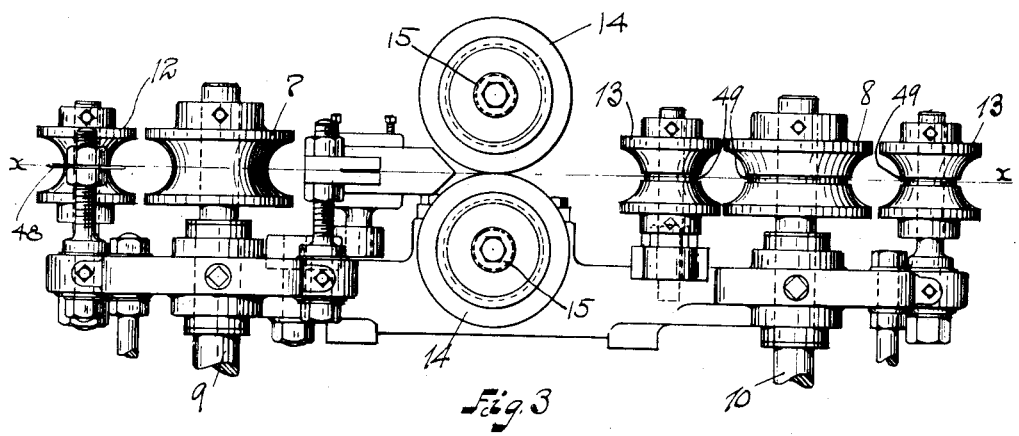
Figure 4:
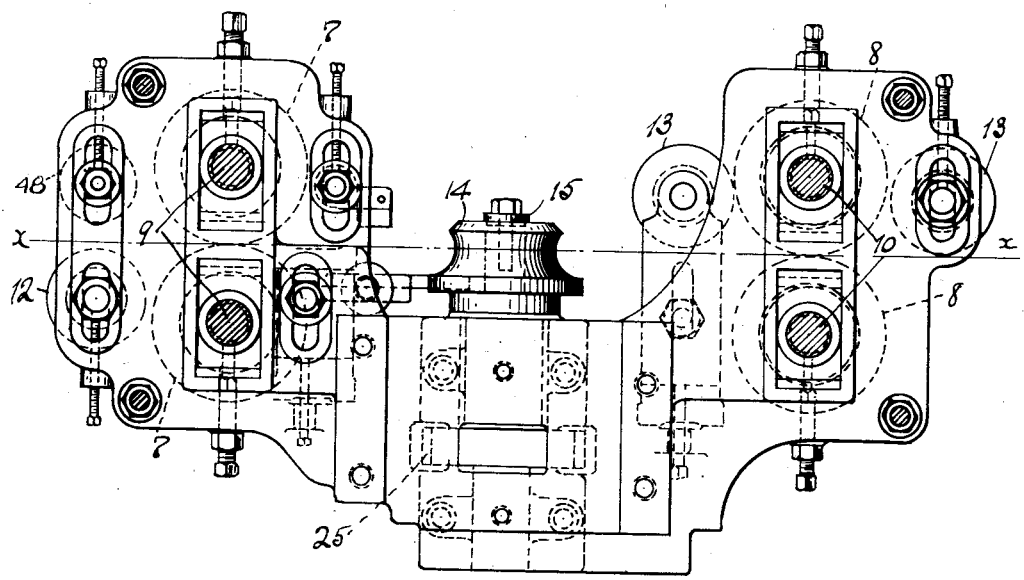

In said annexed drawings: Figure 1 is a front elevational view of an electric welding machine embodying my present improvements; Fig. 2 is a side elevation of the same as viewed from the right in Fig. 1; Fig. 3 is a plan view of certain parts of said machine; Fig. 4 is a side elevation of a portion of the tube feeding mechanism viewed from the same side of the machine as in Fig. 2, but with the driving mechanism therefor omitted; Fig. 5 is a central, longitudinal section through one of the electric current conducting rolls or electrodes and the mounting of the same; Fig. 6 is a transverse section of the mounting of such roll taken on the plane indicated by the line 6—6, Fig. 5; and Fig. 7 is another transverse section of such mounting taken on the plane indicated by the line 7—7, Fig. 5.

The general form of the frame of the machine is well indicated in Figs. 1 and 2, from which it will be observed that the base portion or bed 1 of such frame not only supports the operating mechanism proper, but also serves to house the motor 2, that is utilized in driving said mechanism. Space is rendered available for thus including the motor in the base by removing from such base the transformer 3, which has heretofore been housed therein, and supporting the same on two spaced standards 4 that rise above the base and the operative mechanism directly supported thereon. This disposition of parts not only has the advantage of thus rendering the machine more compact, so as to require less floor space, but the transformer is so disposed that direct connections may be made between the terminals 5 of its secondary coil and the welding electrodes 6, as will be presently described. This is, of course, very desirable owing to the large volume of the current that requires to be used in welding.

The operating mechanism proper comprises in addition to the aforesaid welding electrodes 6, which will be more particularly noted later, two sets of feed rolls, one set 7, 7, located forwardly, and the other 8, 8, to the rear of such electrodes, said two sets of feed rolls being respectively carried on horizontally disposed spindles or shafts 9, 9 and 10, 10, which extend longitudinally of the machine to the right hand end thereof, as viewed in Fig. 1. In addition to such two sets of feed rolls there are provided two sets of guide rolls 12, 12 and 13, 13 alined with such feed rolls and mounted on axes parallel with the shafts 9 and 10; there is also provided a set of pressure rolls 14, 14 which are located directly below the current-conducting rolls 6, being mounted on the upper ends of vertically disposed spindles 15, 15, one lying on each side of the line x—x, along which the tube is designed to be fed.

For driving the two sets of feed rolls 7, 7 and 8, 8 two chains of gears 16 and 17 are provided, connecting the outer ends of the shafts 9, 9 and 10, 10, which carry said rolls, with a pinion 18 on a horizontally extending shaft 19 that lies just below the top of the base portion of the frame, (Figs. 1 and 2). This shaft 19 is adapted to be driven through suitable change-speed gearing 20 and connecting shafts 21 and 22, from the motor which is housed in such base portion as previously described. On the inner end of shaft 19 a beveled pinion 23 is mounted which meshes with a beveled gear 24 that is mounted on the lower end of one of the vertically disposed shafts 15, on the upper ends of which are carried the pressure rolls 14, the other such shaft 15 being driven from said first-named shaft by means of gears 25.

Before referring to Figs. 5, 6 and 7 which show the details of construction of the current conducting rolls, or welding electrodes, proper, and the mountings therefor, it should be noted that said rolls are supported from brackets 26 which are slidably secured to the front faces of the standards whereon the transformer coils are supported, said brackets being vertically adjustable by means of screws 27, which are rotatably but not longitudinally movable in said standards and threaded in said brackets (see Fig. 2).

The main element in the mounting of each electrode or current conducting roll is a central tubular supporting member, or hollow shaft 28, (Fig. 5), the front end of which is in the form of a disk 29 to which may be secured any one of a series of annular plates 30, the outer edges of which differ in their cross-sectional form to fit tubes of different diameters and hence curvatures. Such annular plates 30 are removably secured to the ends of the supporting tubes by means of set screws 31, as will be readily understood. Each said tube is supported in a housing 32 of general cylindrical form by means of two sets of ball-bearings at each end, each set consisting of a thrust and a radial bearing, 33 and 34, respectively, whereby the strain produced in pressing down at an angle upon the tube, as shown in Fig. 5, may be counteracted or taken up. The housing 32 is in turn held in the bracket 26, which constitutes the ultimate support of the electrode mounting, being adjustable in such bracket longitudinally of its axis by means of a collar 35 exteriorly threaded on the rear end of said housing and rotatably, but not longitudinally movable, in said bracket. It will be understood that it will be necessary, not only to vary the adjustment of the electrode up and down, but also transversely, when a change is made in the size of the tubing being welded.

The casing 32 is provided with an opening 36 on its upper face between its ends whereby a portion of the hollow shaft 28, or central tubular support of the electrode, is exposed, such exposed portion being provided with a wearing sleeve 37 tightly fitted thereon, wherewith contact is had by a brush 38 that extends into the opening, or recess in the casing, and is connected with the corresponding terminal of the transformer secondary by means of a heavy flexible copper lead 39. It will be understood that both the brush, the wearing sleeve and central tubular support will be preferably made of this same metal, as also the disk or annulus 30, which actually contacts with the tube. The brush 38 is of semi-cylindrical form on its inner face, and is held in contact with the wearing sleeve on the member by a pair of nuts 40 threaded on bolts 41 and adapted to resiliently press against said brush through the medium of compression springs 42, as shown in the sectional view of Fig. 6.

Insulating material is interposed not only between the transformer 3 and standards 4, and between the latter and the frame of the machine as indicated in Figs. 1 and 2, but also between various parts of the electrode and the support therefor so as to prevent the dissipation of the current through other than the desired channel, viz. from the lead 39 to the brush 38 and thence through the wearing sleeve 37, the central tubular member 28 and the contacting annulus 30 to the work.

Means are also provided for passing a cooling fluid through the central supporting member of the electrode, or shaft 28, whereby said member, as also the electrode may be in a measure cooled, such means consisting of a tube 43 extending longitudinally from the rear to near the front end of the bore of said member, said tube being held by means of a packing ring 44 at the rear end of the member, so as to permit the free rotation of the shaft. Connections 45 and 46 for supplying water to the tube and withdrawing it from the member, or vice versa, are provided, and will be suitably connected, externally of the machine, as need not be explained further.

The general mode of operation of the foregoing described machine should be readily apparent from the description of the construction of its several parts and their individual operation. The tubing to be welded will be passed through the machine on the line x—x in the direction indicated by the arrows in Fig. 3, such tubing being thus fed by the action of the feeding rolls, assisted by the pressure rolls which are also positively driven along with such feed rolls proper. The tube is maintained in proper axial position in passing through such feed and pressure rolls by means of an encircling spline 48 on the uppermost of the guide rolls 12, as shown in Fig. 3, so that the contacting faces of the welding electrodes will lie one on each side of the joint which is to be welded. The fusion of the abutting edges of such joint, which occurs upon the passage of the heating electric current across the same from one such electrode to the other, causes a slight bur or bead to be formed so that the feed and guide rolls on the farther side of the electrodes are formed with encircling grooves 49, as is also shown in said Fig. 3.

By mounting the current conducting rolls in the fashion just described, it will be observed that there is no occasion for the current to pass through the bearings 33 and 34, which support said rolls and which must necessarily be subjected to considerable strain, such current being all passed through an entirely separate connection. This renders it possible to make such circuit connection as nearly perfect as possible, and at the same time prevents both injury to the other bearings, and the disturbing effect which they have on the flow of the current, whereby variations have heretofore been caused in the latter, seriously affecting the quality of the work.

The general arrangement, moreover, of parts entering into the machine, not only renders the structure extremely compact, but also places the transformer where the current can be led directly from the terminals of the secondary coil to the contact blocks, or brushes, of the respective welding electrodes. The amount of current wasted in overcoming resistance between the terminals and electrodes, is hence reduced to a minimum.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In mechanism of the character described, the combination of a frame comprising a base portion and two spaced standards rising above the latter; means adapted to feed work through the space between said standards; brackets vertically adjustably attached to the faces of said standards, respectively; a housing supported in each of said brackets so as to be adjustable transversely of the corresponding standard, said housing being provided with spaced bearings; a shaft journaled in the bearings in each such housing; electrode rolls carried by the inner ends of said shafts in such space between said standards; brushes having electrical contact with said shafts between said bearings; a transformer supported on but insulated from said standards, the secondary coil of said transformer having its terminals disposed adjacent to said shafts; and flexible leads connecting such transformer terminals with said brushes.

2. In mechanism of the character described, the combination of a frame comprising a base portion and two spaced standards rising above the latter; means adapted to feed work through the space between said standards; brackets vertically adjustably attached to the faces of said standards, respectively; a housing supported on each of said brackets so as to be adjustable transversely of the corresponding standard, said housing being provided with spaced bearings; a hollow shaft journaled in the bearings in each such housing; liquid supply and discharge connections with the interiors of said shafts; electrode rolls carried by the inner ends of said shafts in such space between said standards; brushes having electrical contact with said shafts between said bearings; a transformer supported on but insulated from said standards, the secondary coil of said transformer having its terminals disposed adjacent to said shafts; and flexible leads connecting such transformer terminals with said brushes.

3. In mechanism of the character described, the combination with a support; of a hollow shaft rotatably mounted therein; a tube extending from one end of the said shaft to a point near the other end thereof; an electrode roll carried by and closing such latter end of said shaft; and liquid supply and discharge connections for said shaft and tube respectively at the first-named end of said shaft.

4. In mechanism of the character described the combination with a support, of a hollow shaft rotatably mounted therein; a tube extending from one end of said shaft to a point near the other end thereof; an electrode roll carried by and closing such latter end of said shaft; and means for supplying a cooling liquid to said tube and said hollow shaft.

5. In mechanism of the character described, the combination with a suitable frame; of a longitudinally extended housing endwise adjustable in said frame and provided with spaced bearings; a shaft journaled in said bearings; an electrode roll carried by one end of said shaft; and an electric contact brush pressing against said shaft between said bearings.

6. In mechanism of the character described, the combination with a suitable frame; of a longitudinally extended housing endwise adjustable in said frame and provided with spaced bearings; a shaft journaled in said bearings; an electrode roll carried by one end of said shaft; an electric contact brush disposed between said bearings; and means adapted to resiliently press said brush against said shaft.

7. In mechanism of the character described the combination with a suitable frame; of a longitudinally extended housing endwise adjustable in said frame and provided with spaced bearings; a shaft journaled in said frame, an electrode roll carried by one end of said shaft; an electric contact brush pressing against said shaft between said bearings; and water cooling means for said shaft and said roll.

8. In mechanism of the character described the combination with a suitable frame; of a longitudinally extended housing endwise adjustable in said frame and provided with spaced bearings; a hollow shaft journaled in said frame; an electrode roll carried by said shaft; an electric contact brush pressing against said shaft between such bearings; and means for introducing into and discharging a cooling liquid from said hollow shaft.

Signed by me, this 2nd day of May, 1913.

FRANK L. SESSIONS.

Attested by—
H. B. FAY,
JNO. F. OBERLIN.